(No Model.)

F. A. THOMAS.
HALTER CLASP.

No. 273,191. Patented Feb. 27, 1883.

Witnesses.

Frank A. Thomas
Inventor
By Atty.

UNITED STATES PATENT OFFICE.

FRANK A. THOMAS, OF CEDAR RAPIDS, IOWA.

HALTER-CLASP.

SPECIFICATION forming part of Letters Patent No. 273,191, dated February 27, 1883.

Application filed January 2, 1883. (No model.)

*To all whom it may concern:*

Be it known that I, FRANK A. THOMAS, of Cedar Rapids, in the county of Linn and State of Iowa, have invented a new Improvement in Halter-Clasps; and I do hereby declare the following, when taken in connection with accompanying drawings and the letters of reference marked thereon, to be a full, clear, and exact description of the same, and which said drawings constitute part of this specification, and represent, in—

Figure 1:
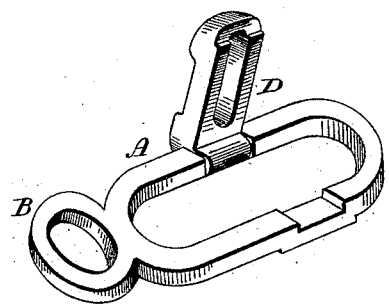
Figure 2:
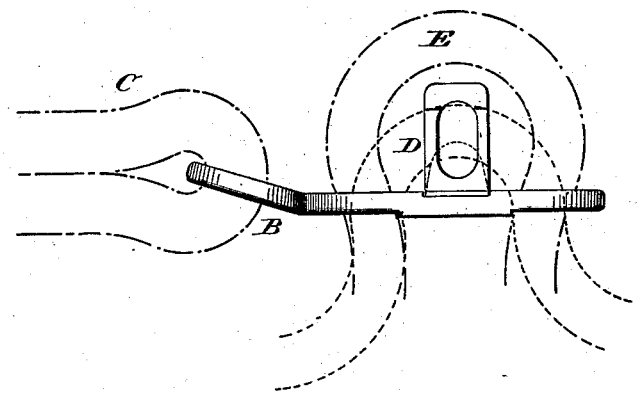
Figure 3:

Figure 1, a perspective view; Fig. 2, a side view illustrating the operation of the invention; Fig. 3, a transverse section.

This invention relates to a clasp for halters, the object being to construct a clasp which may be attached to one end of the halter, the halter then engaged with the clasp, so as to slide thereon until the proper-sized loop is made for hitching the animal, and there engaged, so as to prevent the possibility of its slipping in either direction; and it consists in a frame constructed with a loop at one end, to which one end of the halter is securely fixed, with a transverse bar across the frame, hinged to one side, and so as to turn down upon the other side to close the frame, or raised therefrom to open it, the said bar constructed with a seat on its back corresponding to the shape of the halter, and raised above the plane of the frame, as more fully hereinafter described.

A represents the frame, adapted for a rope halter, the width of the opening through the frame little more than the diameter of the halter, and its ends rounded or made corresponding to the shape of the surface of the halter. At one end of the frame is a loop, B, to which one end, C, of the halter is attached. At the center of one side of the frame the bar D is hinged, so as to turn down across the frame and bear upon the opposite side, as seen in Fig. 3, or be turned up to open the frame, as seen in Fig. 1. The cross-bar is above the plane of the frame, or so as to bring its upper surface considerably above that plane, as seen in Fig. 3. Upon the upper surface of the bar a recess is formed corresponding to the shape of the halter.

The halter is placed around the neck of the animal, and at about the point where engagement is desired the halter is doubled to form a loop, E, which is passed through the frame, as seen in Fig. 2, the bar being turned up for that purpose. When the loop has been passed sufficiently far through, the bar is turned down through the loop onto its bearing on the other side of the frame. Then the halter is drawn down upon the bar, as seen in broken lines, Fig. 2, and in Fig. 3. The raised bar makes such a bend in the halter that, one surface taking its bearing on the bar and the opposite surface upon the under side of the frame, sufficient friction is produced to firmly clamp the halter. When it is desired to remove the halter, reverse the operation.

I am aware that a buckle has been made having a bar hinged to one side of the frame, so as to swing transversely across the frame, provided with a tongue to engage a hole in a strap, and therefore do not claim, broadly, a frame having a transverse hinged bar; but What I do claim is—

The herein-described halter-clasp, consisting of the frame A, constructed with a loop, B, at one end, the bar D hinged to one side of the frame, and so as to lie transversely across the frame, and take its bearing upon the opposite side, the upper surface of the bar raised above the plane of the frame, and constructed with a recess upon its back corresponding to the shape of the halter, substantially as described.

FRANK A. THOMAS.

Witnesses:
JOHN THOMAS,
G. S. PUGH.